United States Patent
Zeng et al.

[11] Patent Number: 6,143,203
[45] Date of Patent: Nov. 7, 2000

[54] HYDROCARBON PARTIAL OXIDATION PROCESS

[75] Inventors: Yongxian Zeng, North Plainfield; Satish S. Tamhankar, Scotch Plains, both of N.J.; Kirk Walton Limbach, Dresher, Pa.; Sekharipuram V. Krishnan, Scotch Plains, N.J.

[73] Assignee: The BOC Group, Inc., Murray Hill, N.J.

[21] Appl. No.: 09/290,768

[22] Filed: Apr. 13, 1999

[51] Int. Cl.[7] .............................. C07C 1/02; C01B 3/02; C01B 3/24; C01B 13/00; C01B 31/18

[52] U.S. Cl. .................... 252/373; 423/219; 423/418.2; 423/648.1; 423/650; 502/525

[58] Field of Search .................... 252/373; 423/648.1, 423/650, 418.2, 219; 95/107, 108, 138, 148; 96/150; 422/145, 144, 232, 233; 502/525

[56] References Cited

U.S. PATENT DOCUMENTS 2,507,502   5/1950   Corner et al. ......................... 252/373

*Primary Examiner*—Tom Dunn
*Assistant Examiner*—Maribel Medina
*Attorney, Agent, or Firm*—Philip H. Von Neida; Salvatore P. Pace

[57] ABSTRACT

Partial oxidation of hydrocarbons to produce hydrogen and carbon monoxide is carried out by a fluidized bed process which includes the steps of passing air through a perovskite-type ceramic mixed conductor in an adsorption zone at an elevated temperature, thereby at least partially saturating the mixed conductor with oxygen, and subsequently contacting the hot, at least partially oxygen-saturated mixed conductor with a hydrocarbon in a partial oxidation reaction zone. During the partial oxidation reaction phase of the process, the sorbed oxygen reacts with the hydrocarbon, thereby producing hydrogen, carbon monoxide or mixtures of these. The oxygen-depleted mixed conductor is recycled to the adsorption zone.

32 Claims, 1 Drawing Sheet

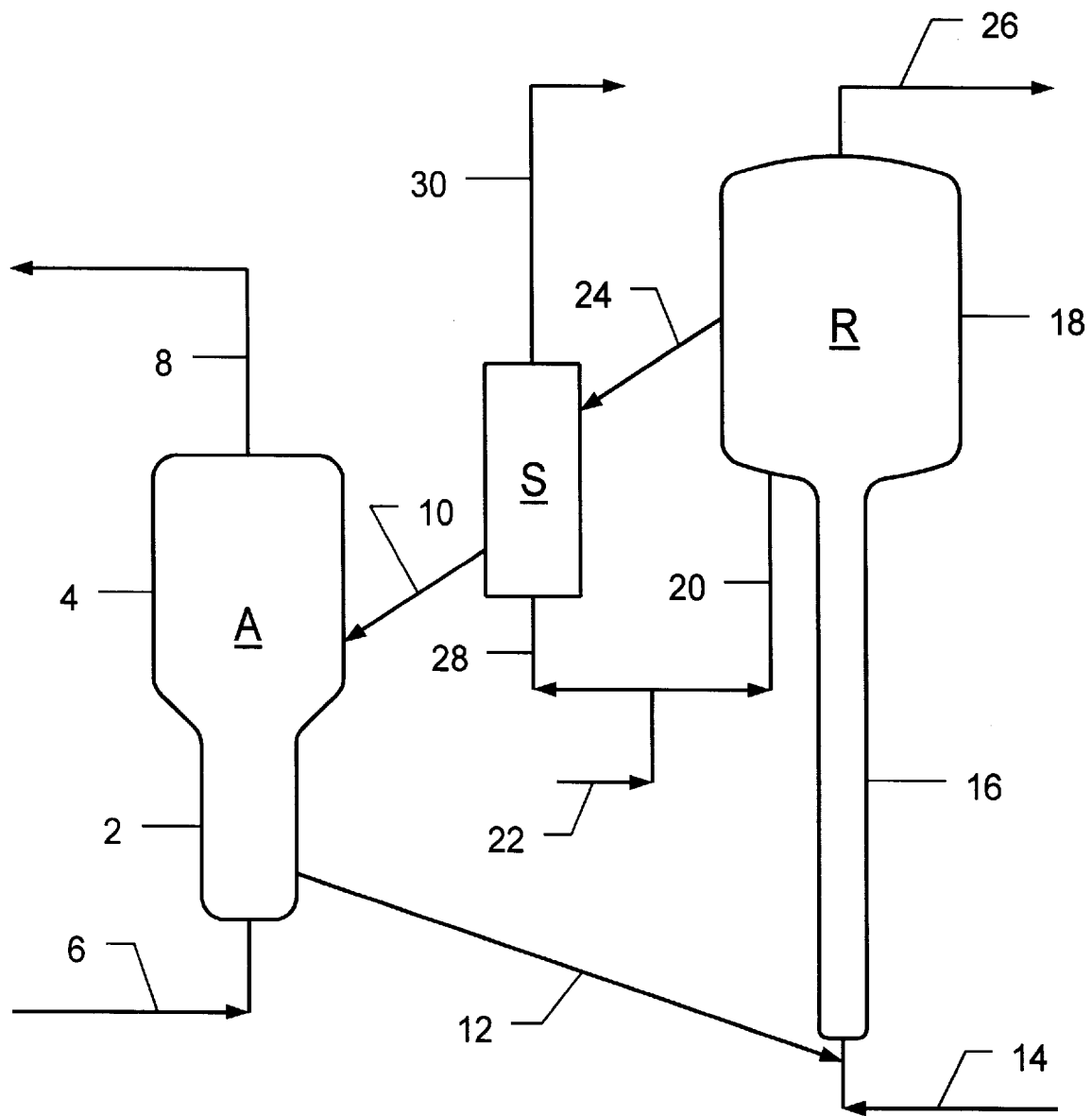

HYDROCARBON PARTIAL OXIDATION PROCESS

FIELD OF THE INVENTION

This invention relates to the partial oxidation of hydrocarbons, and more particularly to the production of hydrogen and carbon monoxide by the oxidation of hydrocarbons. Specifically, the invention relates to a moving bed process comprising the high temperature adsorption of oxygen onto an oxygen-selective mixed conductor in an oxygen adsorption zone, and the partial oxidation of hydrocarbons with the adsorbed oxygen in the at least partially oxygen-saturated ceramic adsorbent at elevated temperatures in a reaction zone.

BACKGROUND OF THE INVENTION

Syngas and its components, hydrogen and carbon monoxide, are conventionally produced by the high temperature partial oxidation of hydrocarbons with controlled amounts of air or oxygen. Although air is less expensive and more convenient to use in partial oxidation reactions, it is less attractive than oxygen for such reactions because the large quantities of nitrogen that are produced when air is used as the oxidant must be subsequently separated from the product gas prior to its use. In addition, the heat energy carried by nitrogen must be recovered before nitrogen leaves the process. The cost of separation, purification and heat exchange equipment for product gas purification and recovery of heat energy from the nitrogen adds considerably to the cost of syngas production using air.

Although oxygen is more desirable than air as an oxidant for partial oxidation reactions, its use is not without disadvantage, in that oxygen must be imported into the system, or it must be generated on site, for example, by means of a cryogenic air separation plant or an adsorption system. In either alternative, using oxygen as the oxidant likewise adds considerably to the cost of the process.

More economical methods of on site production of oxygen for applications such as hydrocarbon partial oxidation reactions are continuously sought. U.S. Pat. No. 5,714,091 discloses an oxygen-based hydrocarbon partial oxidation process in which the oxygen is produced on site by subjecting air to membrane separation using a membrane constructed of perovskite-type ceramic material. Oxygen, which is permeable to the membrane, passes through the membrane and is made to react with hydrocarbons on the downstream side of the membrane unit. The disadvantages of this method of oxygen production are the high cost of production of the membrane and the difficulty of producing membrane structures that are leak-proof.

The partial oxidation of hydrocarbons with oxygen retained in a ceramic-based oxygen-selective mixed conducting substances, such as perovskite-type ceramics, is disclosed in copending U.S. patent application Ser. No. 09/175,175, filed Oct. 20, 1998, the disclosure of which is incorporated herein by reference. The process disclosed therein is a cyclic adsorption process which produces syngas and nitrogen-rich product gases on a semi-continuous basis.

The present invention provides a partial oxidation process that likewise uses a ceramic oxygen-selective mixed conductor, but which has the advantage over the above process of producing hydrogen, carbon monoxide and nitrogen-enriched product gas on a continuous basis.

SUMMARY OF THE INVENTION

According to a broad embodiment, the invention comprises a continuous process for producing hydrogen and carbon monoxide by the partial oxidation of at least one organic compound comprising hydrocarbons, oxygen-containing hydrocarbons or mixtures thereof, comprising the steps:

(a) contacting at least one oxygen-selective mixed conductor in particulate form with an oxygen-containing gas in an adsorption zone at a temperature in the range of about 300 to about 1400° C. and an absolute pressure in the range of about 0.5 to about 50 bara, thereby producing at least partially oxygen-saturated mixed conductor;

(b) contacting the at least one organic compound with the at least partially oxygen-saturated mixed conductor in a reaction zone at a temperature in the range of about 300 to about 1,400° C., thereby partially oxidizing the at least one organic compound and producing product gas comprising hydrogen, carbon monoxide or mixtures of these, and at least partially depleting the mixed conductor of oxygen; and (c) recycling the at least partially oxygen-depleted mixed conductor to the adsorption zone.

Preferably, the at least one oxygen-selective mixed conductor is selected from the group consisting of: (1) perovskite-type ceramics having the structural formula $A_{1-x}M_xBO_{3-\delta}$, where A is an ion of a metal of Groups 3a and 3b of the periodic table of elements or mixtures thereof; M is an ion of a metal of Groups 1a and 2a of the periodic table or mixtures thereof; B is an ion of a d-block transition metal of the periodic table or mixtures there of; x varies from 0 to 1; and δ is the deviation from stoichiometric composition resulting from the substitution of ions of metals of M for ions of metals of A; (2) ceramic substances selected from the group consisting of $Bi_2O_3$, $ZrO_2$, $CeO_2$, $ThO_2$, $HfO_2$ and mixtures of these, the ceramic substance being doped with CaO, rare earth metal oxides or mixtures of these; (3) brownmillerite oxides; and (4) mixtures of any of these.

Preferably, the process is carried out in a moving bed system. More preferably, the moving bed system is a fluidized bed system and the at least partially oxygen-saturated mixed conductor is fluidized and carried into the reaction zone by the at least one organic compound, steam, carbon dioxide or mixtures thereof.

In preferred embodiments, the oxygen-containing gas comprises oxygen and nitrogen; oxygen and argon; or oxygen, nitrogen and argon. In more preferred embodiments, the oxygen-containing gas is air.

In another preferred embodiment, the at least one oxygen-selective mixed conductor is a perovskite-type ceramic. In this embodiment, x of the at least one oxygen-selective mixed conductor structural formula preferably varies from about 0.1 to 1.

In another preferred embodiment, the at least one oxygen-selective mixed conductor is a perovskite-type ceramic and A is one or more f-block lanthanides. In a more preferred embodiment, A is La, Y, Sm or mixtures thereof.

In another preferred embodiment, the at least one oxygen-selective mixed conductor is a perovskite-type ceramic and M is at least one metal of Group 2a of the periodic table of elements. In a more preferred embodiment M is Sr, Ca, Ba or mixtures thereof.

In another preferred embodiment, the at least one oxygen-selective mixed conductor is a perovskite-type ceramic and B is Ti, V, Cr, Mn, Fe, Co, Ni, Cu, Zn or mixtures thereof. In a more preferred embodiment, B is V, Fe, Ni, Cu or mixtures thereof.

In a preferred embodiment, the at least one oxygen-selective mixed conductor is a perovskite-type ceramic and x is about 0.2 to 1.

In a more preferred embodiment, the at least one oxygen-selective mixed conductor is a perovskite-type ceramic and A is La, Y, Sm or mixtures thereof, M is Sr, Ca or mixtures thereof, and B is V, Fe, Ni, Cu or mixtures thereof.

In another preferred embodiment, the at least one oxygen-selective mixed conductor is a ceramic substance of type (2) of the above-named group, the ceramic substance being doped with a rare earth metal oxide selected from the group consisting of $Y_2O_3$, $Nb_2O_3$, $Sm_2O_3$, $Gd_2O_3$ and mixtures of these.

In another preferred embodiment, the process further comprises, between steps (b) and (c), above, the additional step comprising: (1) stripping the at least partially oxygen-depleted mixed conductor with gas that is compatible with the product gas. In a more preferred embodiment, the stripping gas is steam, nitrogen, carbon dioxide or mixtures of these.

In another preferred embodiment, the at least one organic compound has an aliphatic, cycloaliphatic or aromatic structure and it contains 1 to 12 carbon atoms.

In a preferred embodiment, steps (a) and (b) of the process are carried out at a temperature in the range of about 500 to about 1,200° C. In another preferred embodiment, step (a) is carried out at an absolute pressure in the range of about 0.5 to 20 bara. In a more preferred embodiment, steps (a) and (b) are carried out at a temperature in the range of about 650 to about 1,100° C.

In another preferred embodiment, the at least one organic compound contains 1 to 6 carbon atoms. In a more preferred embodiment, the at least one organic compound comprises methane, methanol or mixtures thereof. In another more preferred embodiment, the at least one organic compound comprises natural gas.

In another preferred embodiment, the at least one organic compound comprises a petroleum derivative. More preferably, the petroleum derivative comprises naphtha, gasoline or mixtures thereof.

In another preferred embodiment, at least one agent which promotes the oxygen adsorption of step (a) and/or the partial oxidation of step (b) is combined with the at least one oxygen-selective mixed conductor. Preferably, the at least one agent is a transition metal. More preferably, the transition metal is Cu, Ag, Fe, Ni, Rh, Pt or mixtures thereof.

In another preferred embodiment, the at least one oxygen-selective mixed conductor additionally contains a catalyst selective for partial oxidation reactions that produce partial oxidation reaction products other than hydrogen and carbon monoxide.

In another preferred embodiment, the process further comprises, during step (b), passing a moderating agent selected from steam, carbon dioxide and mixtures thereof through the at least one reaction zone. In a more preferred embodiment, the moderating agent is steam.

BRIEF DESCRIPTION OF THE DRAWING

The drawing FIGURE is a schematic illustration of one embodiment of a system in which the process of the invention can be practiced, comprising a fluidized bed partial oxidation reactor plant comprising an oxygen adsorption unit and a hydrocarbon partial oxidation reactor, and depicting preferred embodiments of the invention.

DETAILED DESCRIPTION OF THE INVENTION

The process of the invention, typically carried out in a recirculating solids reactor system, comprises, in general, an oxygen adsorption step and a hydrocarbon and/or an oxygen-containing hydrocarbon partial oxidation step. Although certain reactor systems are preferable to others for practice of the process of the invention, the particular system in which the process is carried out is a matter of choice. The configuration of the system forms no part of the invention. Although both the oxygen adsorption step and the hydrocarbon partial oxidation step of the process may be carried out in a single reaction vessel system, it is preferred that these steps be carried out in an interconnected multi-vessel system which includes an oxygen adsorption vessel and a partial oxidation reactor. Typically, the partial oxidation reactor may include one or more of a riser section, a fluidized bed section and a moving bed section. Commonly, the reactor comprises both a riser section and a fluidized bed section. Similarly, the unit in which the oxygen-adsorption step is carried out may comprise a riser section, a fluidized bed section, a moving bed section or combinations of these. Suitable recirculating bed designs and their operation are described in U.S. Pat. Nos. 4,668,802, 5,021,588 and 5,519,149, the disclosures of which are incorporated herein by reference.

The process of the invention is useful for carrying out partial oxidation processes that produce hydrogen and/or carbon monoxide, and perhaps additional partial oxidation products, using as the oxidant substantially pure oxygen adsorbed by an oxygen-selective mixed conductor. The oxygen adsorption step is carried out at high temperatures; accordingly, the at least partially oxygen-saturated mixed conductor leaving the adsorption step is at or near the preferred reaction temperature for the partial oxidation step.

The oxygen used in the partial oxidation reaction is provided by contacting an oxygen-containing gas with an oxygen-selective mixed conductor of high adsorption capacity. By "oxygen-selective mixed conductor" is meant a ceramic material that exhibits both oxygen ion conductivity and electronic conductivity. Properties of oxygen-selective mixed conductors are set forth in Lin et al., "Oxygen Permeation Through Thin Mixed Conducting Solid Oxide Membranes", AIChE Journal, May 1994, Vol. 40, No. 5, pp. 786–798, the text of which is incorporated herein by reference. The mixed conductor adsorbs substantially pure oxygen from the oxygen-containing gas. By "oxygen-containing gas" is meant a gas mixture that contains elemental oxygen. The oxygen-containing gas may be an oxygen-nitrogen mixture, an oxygen-argon mixture, oxygen-nitrogen-argon nitrogen-argon mixtures, such as air, oxygen-carbon dioxide mixtures, etc. The preferred oxygen-containing gas is air, particularly ambient air, because of its low cost and ready availability.

Oxygen-selective mixed conductors include ceramic materials selected from: (1) perovskite-type ceramics having the structural formula $A_{1-x}M_xBO_{3-\delta}$, where A is at least one ion of a metal of Groups 3a and 3b of the periodic table of elements, and it is preferably an f block lanthanide, i. e., rare earth elements, and it is more preferably La, Y, Sm or mixtures of these; M is at least one ion of a metal of Groups 1a and 2a of the periodic table, and it is preferably a Group 2a metal, and it is more preferably Sr, Ca, Ba or mixtures of these; B is at least one ion of a d-block transition metal of the periodic table, and it is preferably Ti, V, Cr, Mn, Fe, Co, Ni, Cu, Zn or mixtures of these, and it is more preferably V, Fe, Co, Ni, Cu or mixtures of these; x varies from 0 to 1; and δ is the deviation from stoichiometric composition resulting from the substitution of the ions of metal(s) of M for the ions of metal(s) of A; (2) ceramic materials selected from compounds such as $Bi_2O_3$, $ZrO_2$, $CeO_2$, $ThO_2$, $HfO_2$ and mixtures of these, wherein the ceramic material is doped with CaO, rare earth metal oxides, such as, for example, $Y_2O_3$, $Nb_2O_3$, $Sm_2O_3$, $Gd_2O_3$ and mixtures of these; brownmillerite oxides; and mixtures of any of these.

In particularly preferred embodiments, the adsorbent is a ceramic substance having the perovskite structure. In these preferred embodiments, the maximum oxygen adsorbing capability is attained when x, in the formula above, has a value of 1. Although oxygen adsorption can occur when the value of x in the perovskite-type ceramic used in the process is 0, it is generally not commercially feasible to use perovskite-type ceramics having a value of x less than about 0.01 in the process of the invention. Preferably x has a value of about 0.1 to 1, and most preferably it has a value of about 0.2 to 1. Details of the adsorption step of the process are set forth in the copending U.S. patent application Ser. No. 09/175,176, filed on Oct. 20, 1998, the disclosure of which is incorporated herein by reference.

When the ceramic material is perovskite-type ceramic, the most preferred rare earth ions in the perovskite-type ceramic are La and Y; M is most preferably Sr and Ca; and B is most preferably Ni, Fe or Cu or mixtures of these.

Typical of perovskite-type ceramics suitable for use in the invention are $La_{1-x}Sr_xBO_{3-\delta}$, $Y_{1-x}Sr_xBO_{3-\delta}$, $Y_{1-x}Ca_xBO_{3-\delta}$, and combinations of these, wherein B is Ni, Fe, Cu or mixtures thereof. Specific useful perovskite-type ceramics are those having the structural formulas: $La_{0.8}Sr_{0.2}Ni_{0.8}Fe_{0.2}O_{3-\delta}$, $La_{0.7}Ca_{0.3}FeO_{3-\delta}$, $La_{0.8}Sr_{0.2}MnO_{3-\delta}$, $La_{0.7}Ca_{0.3}FeO_{3-\delta}$, $Y_{0.9}Sr_{0.1}CrO_{3-\delta}$, $SrCoO_3$, etc. In the last compound, $SrCoO_3$, x has a value of 1.

The oxygen-selective mixed conductor is preferably in particulate form, e. g., it can be powdered, granular, in pellet or bead form or other form which is suitable for use in moving bed processes. It may be in the form of substantially pure mixed conductor, or it may be agglomerated with any suitable binder material, i. e., any material which will not interfere with the performance of the mixed conductor or otherwise adversely affect the safety or performance of the system in which the mixed conductor is used.

The oxygen-selective mixed conductor may be treated with one or more substances which promote the oxygen adsorption properties of the mixed conductor and/or the desired hydrocarbon partial oxidation and/or reforming reactions of the invention and/or other partial oxidation reactions. Suitable promoters include metals of high electric conductivity, such as the transition metals, particularly metals of Groups 1b and 8 of the periodic table of elements. Preferred promoters are Cu, Ag, Fe, Ni, Rh, Pt and mixtures of these. The promoter can be deposited onto the adsorbent in the form of a coating or it can be combined with the adsorbent in any other desired form. The particular promoter (s) applied to the adsorbent and the method of combining them with the adsorbent are not critical and form no part of the invention. For ease of discussion, the oxygen-selective mixed conductor, with or without the oxygen adsorption and/or partial oxidation reaction promoter(s) and/or other additives, is sometimes simply referred to herein as the mixed conductor.

The minimum temperature at which the oxygen adsorption step of the process of the invention is carried out is generally at least about 300° C. This step is preferably carried out at temperatures of at least about 500° C., and is most preferably carried out at temperatures of at least about 650° C. The upper temperature limit for carrying out the oxygen adsorption step is below the temperature at which the oxygen-selective adsorbent begins to melt. Generally the maximum upper temperature is not in excess of about 1,400° C. Preferably, the oxygen adsorption step is carried out at temperatures not exceeding about 1,200° C., and this step is most preferably carried out at temperatures not in excess of about 1,100° C.

The partial oxidation step of the process is generally carried out at or near the temperature at which the adsorption step is carried out. Since the partial oxidation step of the process is exothermic, the temperature in the partial oxidation reactor tends to rise as the reaction step of the cycle proceeds. It is often desirable to control the temperature in the reactor to minimize production of carbon dioxide and formation of carbon deposits on the mixed conductor. One method of controlling the reactor temperature is by use of heat exchange means, which, for example, may be in the form of tubing, preferably positioned in the upper section of the reactor. A cooling medium passed through the tubes can remove excess heat, which can be used in other parts of the system, for example, in the oxygen adsorption section.

Another, and often preferred method of controlling the temperature in the reactor is to introduce a moderating agent, such as steam or carbon dioxide, into the reactor. This provides the additional benefit of reforming the hydrocarbon reactant to produce additional hydrogen and/or carbon monoxide. Furthermore, since the reforming step is endothermic, the reforming reaction will prevent the buildup of heat generated by the partial oxidation reaction. The moderating agent can be introduced into the reactor at various points, as described below in more detail.

Fluidized bed design has the additional advantages over fixed bed designs of promoting better heat and mass transfer throughout the adsorption and reaction zones. Temperature distribution in each zone becomes more uniform. For example, temperature variation within the adsorption zone or within the reaction zone is often less than about 10° C., thus tending to minimize creation of cold or hot spots within these zones. Fluidized bed operation also provides uniform distribution of reactant throughout the reactor and good contact between the gas and solid phases, thereby preventing the formation of a moving reaction front, which often occurs in fixed-bed reactors.

The pressure at which the adsorption step of the process is carried out is a matter of choice and, in general, is not critical. Typically, this step is carried out at a pressure at or above about 1 bar, absolute (bara). Higher pressures are generally preferred over lower pressures because the adsorbent has a greater capacity for oxygen at higher pressures. The minimum pressure at which the adsorption step is carried out is preferably about 0.5 bara and is most preferably about 5 bara. The upper pressure limit of the adsorption step of the process is determined by economics and limitations of the reaction system and, in general, this step is desirably carried out at absolute pressures not in excess of about 50 bara, is preferably carried out at pressures not in excess of about 20 bara, and is most preferably carried out at pressures not in excess of about 15 bara.

The pressure at which the partial oxidation step is carried out is likewise a matter of choice and not critical. In general, the adsorption step and the partial oxidation step are usually carried out at substantially the same pressure. In some cases, it is preferred to carry out the partial oxidation step at a pressure below the pressure at which the adsorption step is carried out, since reducing the pressure in the reaction zone shifts the partial oxidation reaction in the direction of completion.

The particular hydrocarbon and/or oxygen-containing hydrocarbon reactant(s) used as feed in the partial oxidation step of the process of the invention are a matter of choice. For ease of discussion, this reactant will generally be referred to hereinafter simply as "hydrocarbon". The hydrocarbon may be any aliphatic, cycloaliphatic or aromatic hydrocarbon having 1 to 12 or more carbon atoms, and it may be saturated or ethylenically unsaturated and straight chain or branched chain. In preferred embodiments of the invention, the hydrocarbon is in the gaseous state under the conditions at which the partial oxidation reaction takes place. Oxygen-containing hydrocarbons which may be used as feed for the partial oxidation reaction include alcohols, ethers, aldehydes, ketones, carboxylic acids, etc. Preferred aliphatic hydrocarbons include those having 1 to 6 carbon atoms, and preferred aromatic hydrocarbons include those having up to twelve carbon atoms. More preferred hydrocarbons are those having 1 to 4 carbon atoms. Typical hydrocarbons include methane, methanol, ethane, propane, the butanes, benzene, the xylenes, refined petroleum fractions, such as naphtha and gasoline, methanol, ethanol, etc. Preferred hydrocarbon feeds include methane, methanol, ethane, ethene, propane, propene, n-butane, butane, n-butylene, I-butylene, butadiene, the pentanes, pentenes, hexanes and hexenes,. Most preferred hydrocarbon feeds for the production of hydrogen and carbon monoxide by the process of the invention are methane, methanol and natural gas.

It may be desirable, for safety reasons, to include a stripping step between the partial oxidation step and the adsorption step to remove residual unreacted hydrocarbon and/or partial oxidation reaction product from the adsorbent prior to its being returned to the adsorption unit of the system. This can be accomplished, for example, by stripping the spent adsorbent with a gaseous substance that is compatible with the partial oxidation product gas. By "compatible" is meant that the gaseous substance can be used in the process of the invention without creating undue safety hazards, and it is easily separable from the product gas or its presence in the product gas is not objectionable with respect to the intended use or further processing of the product gas. Suitable stripping gases include steam, nitrogen and carbon dioxide. A stripping or purge gas may also be used in a section before the oxygen-saturated ceramic is introduced into the partial oxidation reactor, to prevent air from mixing with the hydrocarbons.

It may also be desirable to include an evacuation step in place of or in addition to the stripping step to more completely recover any product gas remaining in the mixed conductor after the partial oxidation step. The evacuation step can be carried out to any desired pressure. For example, the pressure can be reduced to about 0.1 bara or lower, but, for economic purposes, it is preferably not reduced to below about 0.2 bara at this stage of the process.

As mentioned above, a reaction moderating agent, such as steam or carbon dioxide or both of these can be passed through the reaction zone in addition to the hydrocarbon. The moderating agent can be introduced into the partial oxidation reactor with or separately from the hydrocarbon. In this embodiment, the at least partially oxygen-saturated mixed conductor can be fluidized and carried into the partial oxidation reactor by the gaseous hydrocarbon reactant and/or by the steam and/or carbon dioxide. The advantage of this variation is that reforming of the hydrocarbon occurs in addition to partial oxidation of the hydrocarbon. The steam and/or carbon dioxide reforming reaction can take place even after substantially all of the sorbed oxygen is consumed by the partial oxidation reaction. Since the reforming reaction is endothermic, it may be desirable or necessary in some cases to provide supplemental heat to the reaction zone to compensate for heat consumed in the reforming reaction. Supplemental heat can be provided by any suitable means, such as by the use of heaters.

If desired, the partial oxidation step of the process can be used to produce partial oxidation products in addition to carbon monoxide and hydrogen. This can be accomplished by combining a catalyst which promotes the desired additional partial oxidation reaction with the oxygen-selective mixed conductor and using the appropriate hydrocarbon as the feed stream.

The invention can be more easily understood by reference to the appended drawing, considered in conjunction with the following description. Equipment that is not necessary for an understanding of the invention, such as auxiliary valves, storage vessels and pumps, have not been included in the illustrated system. The system illustrated in the drawing includes, as principal units, adsorber A, partial oxidation reactor R, and steam stripper S. Adsorber A, as stated above, can be any type of equipment which provides intimate contact between a particulate material and a gas. In the system illustrated in the drawing, adsorber A includes dense phase section 2, positioned at the lower end of the vessel, and dilute phase section 4, located above dense phase section 2. Adsorber A is also provided with oxygen-containing gas inlet line 6, oxygen-depleted gas outlet line 8, oxygen-depleted mixed conductor return line 10 and oxygen-containing mixed conductor line 12. Line 12 is connected to the lower part of hydrocarbon feed inlet line 14, which, in turn, is connected to the lower part of partial oxidation reactor R.

Reactor R can be any type of reactor suitable for carrying out moving catalyst bed partial oxidation reactions. In the system illustrated in the drawing, reactor R includes riser section 16 and dilute phase section 18, positioned above riser section 16. In some embodiments of the invention hydrocarbon reforming is carried out in part of, for example in the upper portion of, section 18. In such embodiments, reactor R can be provided with moderating gas inlet line 20, the upstream end of which is connected to stripping gas supply line 22. Section 18 is also provided with oxygen-depleted mixed conductor discharge line 24 and product gas discharge line 26. The downstream end of line 24 is connected to oxygen-depleted mixed conductor stripper S.

Stripper S can be any vessel suitable for stripping a particulate material with a stripping gas. Stripper S is provided with stripping gas inlet line 28, the upstream end of which is connected to stripping gas supply line 22, and stripping gas outlet line 30, The upstream end of oxygen-depleted mixed conductor line 10 is connected to stripper S.

In practicing the process of the invention in the system illustrated in the drawing, particulate mixed conductor of the type described above is circulated in fluidized form through the system comprising adsorber A, reactor R and stripper S. In adsorber A, recycled mixed conductor is contacted with air at a temperature and pressure in the ranges specified above. The air enters adsorber A through line 6 and passes upwardly through adsorber A. The desired adsorption temperature can be initially established in adsorber A by any suitable means, such as by heating the air entering this vessel or by combusting fuel and passing the hot combustion gases through adsorber A prior to introduction of air thereinto. The method used to heat the air and/or mixed conductor in adsorber A during, for example, start-up is a matter of choice and forms no part of this invention. Part or all of the heat necessary to maintain the temperature in the adsorption zone in the desired range can be provided by means of the oxygen adsorption step, which is exothermic.

The air entering adsorber A passes upwardly through dense phase zone 2, and as it does so, it comes into intimate contact with mixed conductor that is descending through zone 2. As indicated above, the counterflow arrangement illustrated in the drawing is only one of several methods of air-mixed conductor contact that can be employed. As the air contacts the mixed conductor, oxygen is adsorbed from the air by the mixed conductor, thereby at least partially saturating the mixed conductor with oxygen. Oxygen-depleted air rises into dilute phase zone 4 where it separates from the particulate mixed conductor. One or more cyclone separators can be positioned in the upper part of section 4 to facilitate separation of the oxygen-depleted gas and the mixed conductor. The nonadsorbed air fraction, now comprised substantially of nitrogen, exits adsorber A through line 8, and is vented to the atmosphere, sent to storage or further processed.

The hot, at least partially oxygen saturated mixed conductor passes through line 12 and enters line 14. The mixed conductor mixes with gaseous hydrocarbon feed, for example, methane, entering reactor R through line 14, and the mixture flows upwardly through riser section 16 of reactor R. As the hot mixed conductor and hydrocarbon mix, the hydrocarbon undergoes partial oxidation, producing a gas mixture comprised substantially of carbon monoxide and hydrogen, according to the following equation, in which the hydrocarbon is methane:

$$2CH_4(g) + O_2(s) \rightarrow 2CO(g) + 4H_2(g)$$

The temperature and rate of mixed conductor and hydrocarbon flow through reactor R are preferably maintained at levels that maximize production of hydrogen and/or carbon monoxide and minimize the formation of carbon dioxide and coking of the mixed conductor. After passing through riser 16 of reactor R, the mixed conductor-gas mixture enters dilute phase section 18, where the velocity of the mixture decreases sufficiently to effect separation of the mixed conductor and gas phase. As was the case in adsorber A, separation of the mixed conductor and product gas can be assisted by means of gas separators, such as cyclone separators situated at the top of fluid section R. The product gas passes out of reactor R through line 26 and is sent to storage or to a downstream application. If desired, the product gas stream can be sent to adsorption or other gas separation means to recover unreacted hydrocarbon therefrom. The recovered hydrocarbon can be recycled to reactor R, if desired.

As noted above, it may sometimes be desired to reform unreacted hydrocarbon in reactor R, in addition to the partial oxidation reaction. This is often the case when the quantity of oxygen present in the mixed conductor is insufficient to convert all of the hydrocarbon entering reactor R to the desired partial oxidation products and/or when coking of the mixed conductor occurs in reactor R. Reforming can be accomplished by introducing a moderating agent, such as steam or carbon dioxide, into fluid section 18 of reactor R via lines 22 and 20. The moderating agent reacts with unreacted hydrocarbon and carbon deposits on the mixed conductor to produce additional hydrogen and/or carbon monoxide by one or more of the following reactions, wherein, as above, the hydrocarbon is methane:

$$CH_4 + H_2O \rightarrow CO + 3H_2$$

$$CH_4 + CO_2 \rightarrow 2CO + 2H_2$$

$$C + H_2O \rightarrow CO + 2H_2$$

$$C + CO_2 \rightarrow 2CO$$

Since these reactions are endothermic, additional heating of the reactants may be required. Although most or all of the additional heat required for the reactions can be provided by the hydrocarbon partial oxidation reaction, supplemental heating can be provided, if necessary, by other heating means (not shown).

The oxygen-depleted mixed conductor separated from the gas product leaves reactor R through line 24 and enters stripper S. As the spent mixed conductor passes through stripper S, entrained product gas is stripped therefrom by stripping steam or other appropriate stripping gas, introduced into stripper S through line 28. The stripped gas-stripping agent mixture passes out of stripper S through line 30, and is sent to storage or otherwise processed or disposed of. If it is desired to evacuate stripper S, this can be accomplished by providing a gas pumping means, such as a vacuum pump, in line 30.

The clean mixed conductor is recycled to adsorber A through line 10. Fresh mixed conductor can be introduced into the system at any desired point, for example by adding it to adsorber A through fresh mixed conductor filling means (not shown).

It will be appreciated that it is within the scope of the present invention to utilize conventional equipment to monitor and automatically regulate the flow of gases within the system so that it can be fully automated to run continuously in an efficient manner.

The invention is further illustrated by the following hypothetical examples in which, unless otherwise indicated, parts, percentages and ratios are on a volume basis. Gas flow rates are at standard temperature and pressure.

EXAMPLE 1

The example is simulated using a circulating reactor similar to the system illustrated in the appended drawing but excluding an adsorbent stripping zone. The mixed conductor is assumed to be a particulate perovskite ceramic of the formula $La_{0.8}Sr_{0.2}Co_{0.5}Fe_{0.5}O_{3-\delta}$ having a particle size of about 20 to 100 microns. The adsorption and partial oxidation reaction zones are each assumed to be maintained at a temperature of about 950° C. The pressure in the adsorption zone is assumed to be about 20 psig, and the pressure in the reaction zone is assumed to be lower than the pressure in the adsorption zone. The simulated hydrocarbon feed to the system is methane at a flow rate of 10 l/min (liters per minute), and air feed to the adsorption zone of the system is simulated to be about 28.9 l/min. The solids residence time in the adsorption zone is assumed to be in the range of 10 sec. to 1 min., and that in the reaction zone is assumed to be in the range of 20 sec. to 2 min. The gas residence time in the adsorption zone is assumed to be in the range of 0.001 to 0.1 sec., and that in the reaction zone is assumed to be in the range of 0.01 to 1 sec.

Based on these conditions, a product stream at a flow rate of about 28.5 l/min and containing 63.5% hydrogen, 30.0%, carbon monoxide, 1.75% methane, 1.58% carbon dioxide and 3.16% water vapor is projected to be produced. The exhaust gas from the adsorption zone is projected to be 20.96 l/min and it is projected to have a composition of 97.6% nitrogen, 2.27% carbon monoxide and 0.12% carbon dioxide. Methane conversion is selected to be 95%, and hydrogen selectivity is projected to be 95%. The total selectivity of carbon monoxide over carbon dioxide for the two-step process is selected to be 95%. About 5% of the methane feed is projected to be converted to carbon deposits on the circulating adsorbent, and the carbon deposits are projected to be oxidized to carbon monoxide and carbon dioxide during the adsorption step.

EXAMPLE 2

The simulation of Example 1 is repeated except that stripping of the spent adsorbent exiting the reaction zone with steam, flowing at a rate of 0.50 l/min, is included in the simulation. In this example, the required flow rate of air to the system is projected to be about 24.6 l/min, and the exhaust gas from the adsorption zone is projected to be about 19.5 l/min and comprising about 100% nitrogen.

This example illustrates the partial oxidation of methane to carbon monoxide and hydrogen in a fluidized bed reactor using particulate perovskite-type ceramics as the oxygen adsorbent and an air feed to the oxygen adsorption section of the system.

Although the invention has been described with particular reference to a specific equipment arrangement and to specific examples, these features are merely exemplary of the invention and variations are contemplated. For instance, the invention can be practiced by conducting the hydrocarbon partial oxidation step in the liquid phase. Furthermore, as stated above, the process of the invention can be carried out in systems which are variations of the system illustrated in the drawing. For example, moderating agents, such as steam or carbon dioxide can be introduced into the system via line 14 with the hydrocarbon, and/or a portion of the nitrogen-rich product gas passing out of the system through line 8 can be introduced into stripper S as a stripping gas. The scope of the invention is limited only by the breadth of the appended claims.

What is claimed is:

1. A continuous process for producing hydrogen and carbon monoxide by the partial oxidation of at least one organic compound selected from the group consisting of hydrocarbons, oxygen-containing hydrocarbons and mixtures thereof, comprising the steps:

(a) contacting at least one oxygen-selective mixed conductor in particulate form selected from the group consisting of (1) perovskite-type ceramics having the structural formula $A_{1-x}M_xBO_{3-\delta}$, where A is an ion of a metal of Groups 3A and 3B of the periodic table of elements or mixtures thereof; M is an ion of a metal of Groups 1A and 2A of the periodic table or mixtures thereof; B is an ion of a d-block transition metal of the periodic table or mixtures thereof; x varies from 0 to 1; and $\delta$ is the deviation from stoichiometric composition resulting from the substitution of ions of metals of M for ions of metals of A; (2) ceramic substances selected from the group consisting of $Bi_2O_3$, $ZrO_2$, $CeO_2$, $ThO_2$, $HfO_2$ and mixtures of these, the ceramic substance being doped with CaO, rare earth metal oxides or mixtures of these; (3) brownmillerite oxides; and (4) mixtures of any of these with an oxygen-containing gas in an adsorption zone at a temperature in the range of about 300 to about 1400° C. and an absolute pressure in the range of about 0.5 to about 50 bara, thereby producing at least partially oxygen-saturated mixed conductor;

(b) contacting said at least one organic compound with said at least partially oxygen-saturated mixed conductor in a reaction zone at a temperature in the range of about 300 to about 1,400° C., thereby partially oxidizing said at least one hydrocarbon and producing product gas comprising hydrogen, carbon monoxide or mixtures of these, and at least partially depleting the mixed conductor of oxygen; and (c) recycling the at least partially oxygen-depleted mixed conductor to said adsorption zone.

2. The process of claim 1, carried out in a moving bed system.

3. The process of claim 2, wherein said at least partially oxygen-saturated mixed conductor is fluidized and carried into said reaction zone by said at least one organic compound, steam, carbon dioxide or mixtures thereof.

4. The process of claim 1, wherein x varies from about 0.1 to 1.

5. The process of claim 4, wherein A is at least one f-block lanthanide.

6. The process of claim 4, wherein M is at least one metal of Group 2a of the periodic table of elements.

7. The process of claim 4, wherein B is Ti, V, Cr, Mn, Fe, Co, Ni, Cu, Zn or mixtures thereof.

8. The process of claim 1, wherein x is 0.2 to 1.

9. The process of claim 8, wherein A is La, Y, Sm or mixtures thereof.

10. The process of claim 9, wherein M is Sr, Ca or mixtures thereof, and B is V, Fe, Ni, Cu or mixtures thereof.

11. The process of claim 8, wherein M is Sr, Ca, Ba or mixtures thereof.

12. The process of claim 8, wherein B is V, Fe, Ni, Cu or mixtures thereof.

13. The process of claim 1, wherein said at least one oxygen-selective mixed conductor is a ceramic substance of (2), said ceramic substance being doped with a rare earth metal oxide selected from the group consisting of $Y_2O_3$, $Nb_2O_3$, $Sm_2O_3$, $Gd_2O_3$ and mixtures of these.

14. The process of claim 1 or claim 3, wherein said oxygen-containing gas comprises oxygen and nitrogen, oxygen and argon, or oxygen, nitrogen and argon.

15. The process of claim 14, wherein said oxygen-containing gas is air.

16. The process of claim 15, further comprising, between steps (b) and (c), the additional step comprising stripping the at least partially oxygen-depleted mixed conductor with gas that is compatible with said product gas.

17. The process of claim 16, wherein the stripping gas is steam, nitrogen, carbon dioxide or mixtures of these.

18. The process of claim 15, wherein said at least one organic compound has an aliphatic, cycloaliphatic or aromatic structure and it contains 1 to 12 carbon atoms.

19. The process of claim 18, wherein steps (a) and (b) are carried out at a temperature in the range of about 500 to about 1,200° C.

20. The process of claim 19, wherein step (a) is carried out at an absolute pressure in the range of about 0.5 to 20 bara.

21. The process of claim 20, wherein said at least one organic compound contains 1 to 6 carbon atoms.

22. The process of claim 21, wherein steps (a) and (b) are carried out at a temperature in the range of about 650 to about 1,100° C.

23. The process of claim 22, wherein said at least one organic compound comprises methane, methanol or mixtures thereof.

24. The process of claim 22, wherein said at least one organic compound comprises natural gas.

25. The process of claim 22, wherein said at least one organic compound comprises a petroleum derivative.

26. The process of claim 25, wherein said petroleum derivative comprises naphtha gasoline or mixtures thereof.

27. The process of claim 15, wherein at least one agent which promotes the adsorption of step (a) and/or the partial oxidation of step (b) is combined with said at least one oxygen-selective mixed conductor.

28. The process of claim 27, wherein said at least one agent is a transition metal.

29. The process of claim 27, wherein said transition metal is Cu, Ag, Fe, Ni, Rh, Pt or mixtures thereof.

30. The process of claim 15, wherein said at least one oxygen-selective mixed conductor additionally contains a catalyst selective for partial oxidation reactions that produce partial oxidation reaction products other than hydrogen and carbon monoxide.

31. The process of claim 15, further comprising during step (b), passing a moderating agent selected from the group consisting of steam, carbon dioxide and mixtures thereof through said at least one reaction zone.

32. The process of claim 31, wherein said moderating agent is steam.

* * * * *